Figure 1:
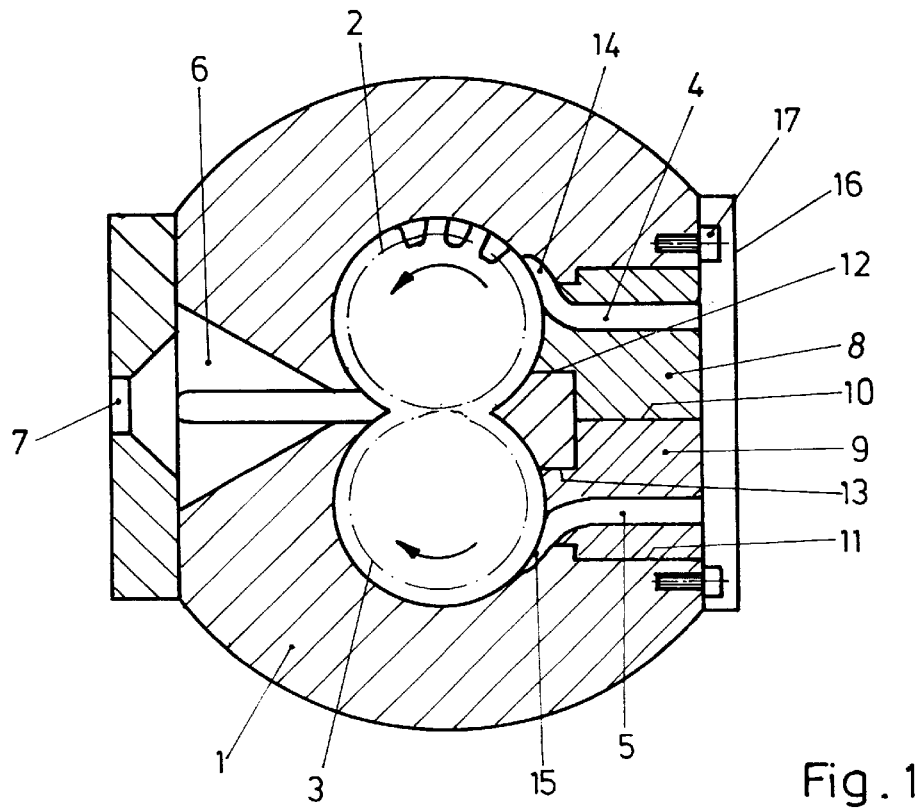

United States Patent
Uth et al.

[11] Patent Number: 5,855,927
[45] Date of Patent: Jan. 5, 1999

[54] EXTRUDER

[75] Inventors: Peter Joachim Uth, Fulda; Thomas Menz, Eichenzell, both of Germany

[73] Assignee: Uth GmbH, Fulda, Germany

[21] Appl. No.: 939,101

[22] Filed: Sep. 26, 1997

[30] Foreign Application Priority Data

Sep. 27, 1996 [DE] Germany .................. 196 39 735.9

[51] Int. Cl.[6] ..................... B29B 7/48; B29B 7/60
[52] U.S. Cl. .................... 425/183; 425/186; 425/190; 425/203; 425/204; 425/205; 425/584; 425/447; 425/449; 425/461; 366/76.1; 366/76.5; 366/76.93
[58] Field of Search ................... 425/190, 192 R, 425/203, 204, 205, 582, 584, 585, 461, 183, 186, 447, 449, 812; 366/75, 76.1, 76.5, 76.93

[56] References Cited

U.S. PATENT DOCUMENTS

| | | | |
|---|---|---|---|
| 4,286,882 | 9/1981 | Schiesser | 366/76.5 |
| 4,711,647 | 12/1987 | Crathmann | 425/203 |
| 4,718,770 | 1/1988 | Christy | 366/76.5 |
| 5,267,847 | 12/1993 | Bohm et al. | 425/192 R |
| 5,378,415 | 1/1995 | Crohlisch et al. | 425/203 |

FOREIGN PATENT DOCUMENTS

| | | |
|---|---|---|
| 2 227 525 | 11/1973 | Germany . |
| 2 417 865 | 10/1974 | Germany . |
| 30 38 580 | 8/1988 | Germany . |
| 41 14 265 | 11/1992 | Germany . |

OTHER PUBLICATIONS

T. Bartilla, "Zahnrapumpen in Neuen Extrusionsanwendungen" (Gear Pumps In New Uses of Extrusion), in Kunststoffe 82 (Synthetics 82), 1992, 10, pp. 927–930.

*Primary Examiner*—Khanh P. Nguyen
*Attorney, Agent, or Firm*—Evenson, McKeown, Edwards & Lenahan, P.L.L.C.

[57] ABSTRACT

An extruder for the plastification and extrusion of a rubber mixture in the form of two cold material strips through two inlet passages (4, 5) has in a housing (1) two gears (2, 3) meshing with one another in the manner of a gear pump. The inlet passages (4, 5) are provided each in an insert (8, 9) which is held replaceably in the housing (1). In this manner it becomes possible, by exchanging the inserts (8, 9) to adapt to various materials to be worked by the extruder.

16 Claims, 3 Drawing Sheets

EXTRUDER

The invention relates to an extruder for the plastification and extrusion of a rubber mixture fed in the form at least of one cold material strip, which has two gears disposed in a housing and meshing with one another in the manner of a gear pump, at least one inlet passage on the inlet side for the material strip, and an outlet in the peripheral surface of the housing, the direction of rotation of the gears being such that the material strip is fed between a gear and the housing to the outlet.

Such an extruder is the subject matter of DE 345 406. In contrast to worm extruders, extruders operating on the gear pump principle have found no application, although the worm extruders usually used for extruding cold rubber mixtures are very bulky, expensive to buy, and demand an undesirably great amount of energy.

In the extruder according to the said DE 345 406, a single strip of material is fed through a pull-in apparatus formed by two rolls, is divided into two strips in the extruder housing, and then is delivered on the outside of a gear to the outlet. For such division into two material strips relatively great energy is necessary, which can result in an unacceptably high heating of the material at the knife performing this division. Furthermore, it is disadvantageous in the known extruder that the geometry of the inlet is optimum only for one particular material. In practice, various manufacturers of extruded rubber products, however, process different materials which require differently configured extruders. It has been found that the optimum geometry of an extruder for a particular material cannot be reliably determined beforehand, so that it would be desirable if the user of the extruder could adapt it largely to the requirements of his material.

The invention is addressed to the problem of designing an extruder of the kind referred to above, such that it can be adapted with as little expense as possible in its geometry to the materials to be processed.

This problem is solved according to the invention in that the inlet passage is provided in an insert held releasably in the housing of the extruder.

In such an extruder, for different materials different inserts can be provided which differ from one another in the geometry of the inlet passage. The possibility is thus obtained of using the insert best suited, according to experience, for the particular material to be extruded, or else to determine by using the extruder with various inserts which of them is best suited. Since the inserts are relatively small components that are inexpensive to male, it is also possible to supply inserts without an inlet passage and leave it to the user of the extruder to male an insert passage based on his own experience.

The material is fed in the extruder with particularly low friction losses if the insert consists of a plastic which has good antifriction properties for the strip of material fed into it. In addition, such inserts made of plastic offer the advantage that they are inexpensive to make and their inlet passage can be reworked at little expense in order to achieve any additional optimization.

Polytetrafluorethylene has proven especially advantageous as the material for the insert.

The extruder is especially advantageous structurally if the housing has on its input side at least an approximately circular cavity from which an opening rectangular in cross section leads to a gear, and if the insert of corresponding shape is seated in this cavity and opening.

The insert can be fastened in the cavity and opening very simply if it is held by a mounting frame screwed to the housing and reaching beyond the insert.

If the extruder is to have two inlet passages, then an insert with two inlet passages can be provided. It is more advantageous, however, if according to an embodiment of the invention, two circular cavities are provided at the inlet side, each with an opening, the cavities intersecting where the gears engage one another, and if accordingly two inserts, each having a flat on the confronting sides, are provided in the cavities in a mirror-image relationship to one another.

The filling of the gullets of the gears will be especially good if the inlet passage leads to a pocket that tapers wedge-like toward the gear in the direction of movement of the latter. Thus, the material is compressed as the gullets are filled, thereby preventing air inclusions.

The air present in the gullets is driven axially outward, so that air inclusions do not occur when, according to another advantageous embodiment of the invention, the wall of the pocket opposite the gear is cambered across the width of the gear and is closer to the middle of the gear than at the sides. The embodiment with the pockets in the housing is also advantageous in extruders, even regardless of inserts in the inlet.

The same applies to another embodiment according to which the two inlet passages start at a distance apart and a feeder means forcing the strip of material into the extruder is disposed ahead of the extruder. Thus, the material strip is slightly squeezed in the axial direction as it enters, thus also improving the filling of the extruder.

The drive and control of the feeder means are especially simple in design if the feeder means is driven at a slightly higher feed speed than the extruder, and if a slip clutch is provided to equalize the different feed speeds. A feeder means of this kind can be driven in a simple manner by the motor of the extruder.

The slip clutch operates free of wear if it is a hysteresis clutch operating with a magnetic field.

If the quality of the extruded product must satisfy especially stringent requirements, provision can be made for the inlet passages to be connected to a vacuum source, plus an airlock for feeding the material strip. This prevents air inclusions from occurring in the extruder.

The airlock can be made at extremely low cost if, according to another embodiment of the invention, it is formed of an elastic tube of a size to accommodate the material strip.

If it is desired to evacuate an extruder, then the danger exists that the fluid material present therein may be sucked up by the vacuum source and thereby clog the vacuum connection. This can be prevented with little difficulty if only one inlet passage is provided for feeding the material strip, and a vacuum connection is provided on the inlet side at the gear, to which no inlet passage leads.

Also, evacuation of the inlet side is advantageous, regardless of the rest of the design of the extruder. This applies without restriction also to an embodiment wherein an extruder nozzle is held in the extruder housing for axial displacement against the force of a spring. Since the extruder nozzle is thus displaceable, it can shift with volume fluctuations. Pulsations produced by the tooth geometry, and/or by the different filling of the tooth gullets, are thus compensated, resulting in a decided improvement of the quality of the extrudate.

The spring is optimally adapted to the prevailing high pressures if it is formed by at least one plate spring engaging a shoulder in the outlet end of the housing.

Figure 3:
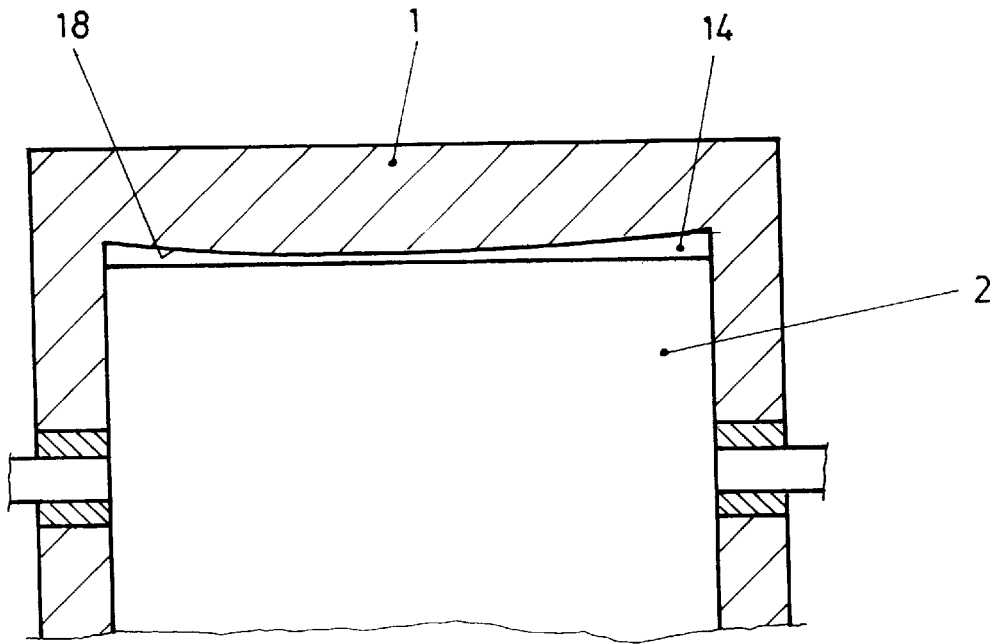
Figure 4:
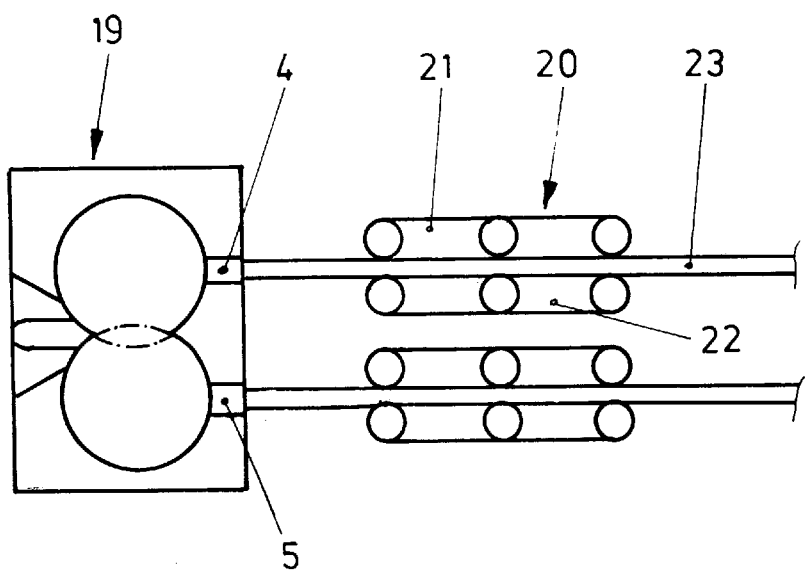
Figure 5:
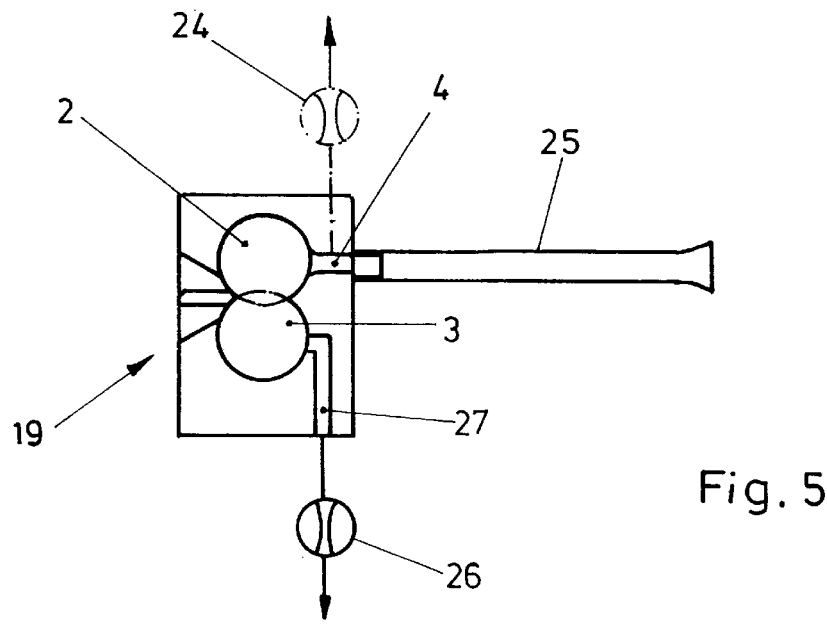
Figure 6:
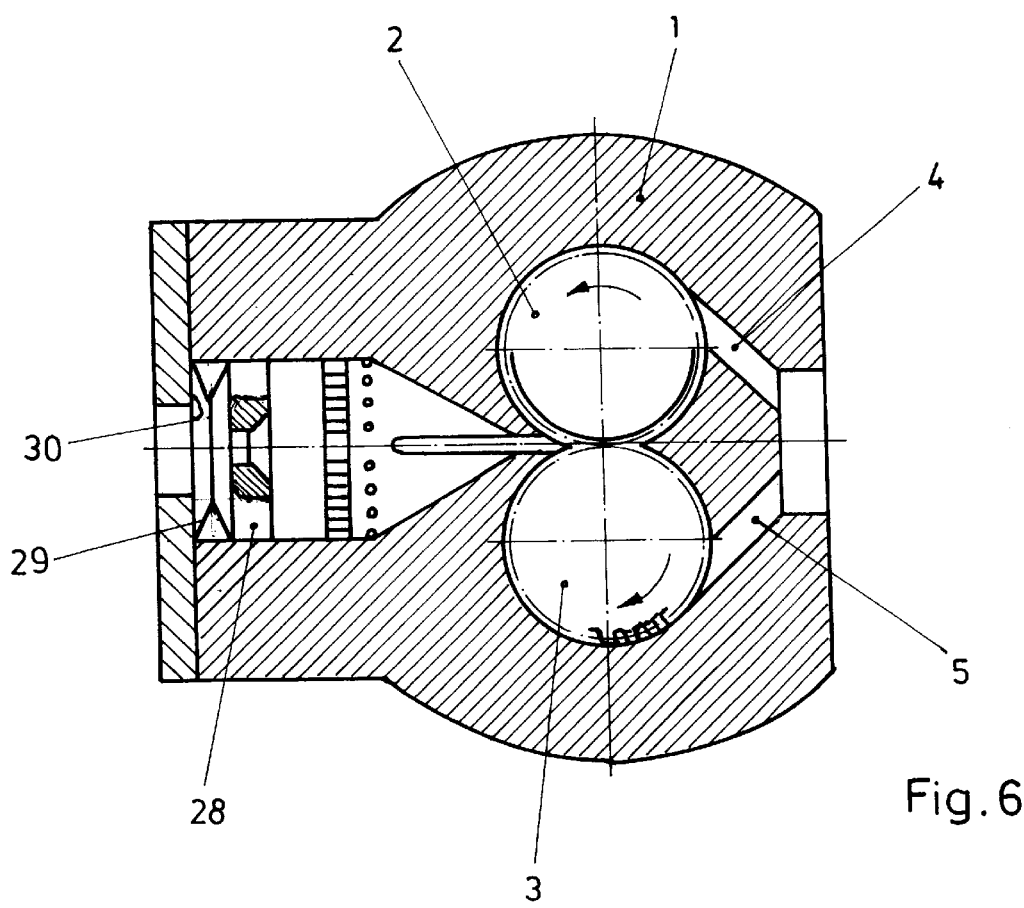

The invention admits of numerous embodiments. For further explanation of its basic principle several of them are represented in the drawing and will be described below. In the drawing, FIG. 1 is an end view of an extruder, in cross section, according to the invention, FIG. 2 is an end view of an extruder, and view of the inlet end of the extruder without inserts, FIG. 3 is longitudinal section through a portion of the extruder, FIG. 4 is a schematic of an extruder with an insertion device according to the invention, FIG. 5 is a schematic of an extruder showing a lock according to the invention at the inlet and, FIG. 6 is a cross section through an additional embodiment of an extruder according to the invention.

FIG. 1 shows a housing 1 in which two gears 2, 3 are journaled. The latter can be driven so that, as indicated by two arrows, they can rotate in opposite directions. Two inlet passages 4, 5 lead from the right side to the gears 2, 3. The material fed through these inlet passages leaves the extruder via an outlet 6 and an extrusion nozzle 7 provided at that point.

It is important to the invention that each inlet passage 4, 5 is provided in an insert 8, 9 of plastic, preferably polytetrafluoroethylene. These inserts are situated each in a cavity 10, 11 and extend into the opening 12, 13 of rectangular cross section which runs from there to the gears 2, 3. A portion of the inlet passages 4, 5 opens into a pocket 14, 15 in the interior circumference of the housing 1. These pockets 14, 15 taper in the direction of rotation of the gears 2, 3. The inserts 8, 9 are held in the recesses 10, 11 by a frame 16 fastened to the housing 1 by means of screws 17.

Figure 2:
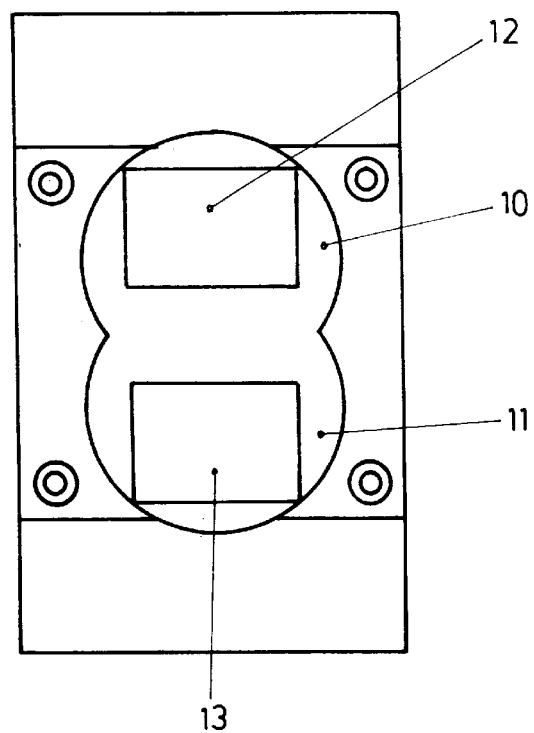

FIG. 2 shows that the recesses 10, 11 are of circular cross section, but slightly overlap. Also to be seen in FIG. 2 are the rectangular openings 12, 13.

FIG. 3 shows in cross section the pocket 14 between the gear 2 and the housing 1. It is to be seen that the pocket 14 has a wall surface 18 which is cambered in shape and it is further away at the two sides from the gear 2 than it is in the middle area.

FIG. 4 shows an extruder 19 which corresponds to the extruder of FIG. 1. On the inlet side a feeder means 20 is placed in front of the extruder 19. This consists of two pairs of conveyor belts 21, 22, between which the strip of material 23 is gripped. The pairs of conveyor belts 21, 22 are driven such that the material strips 23 are forced into the extruder 19. For this purpose they can be driven by the motor of the extruder 19 at a slightly higher speed than the extruder is driven, but then they require a slip clutch which can be constituted by a magnetic hysteresis clutch.

In FIG. 5 a vacuum source 24 is represented in broken lines, which is connected to the inlet channel 4. An air lock 25 is fastened to the inlet channel 4; it is formed by an elastic tube which is kept open at its free end by a frame-like component not shown, and the material strip 23 shown in FIG. 4 is introduced through it. The vacuum in the inlet channel 4 then causes the hose to constrict sealingly against the material strip 23 so that no air is sucked in.

In FIG. 5 a vacuum source 26 is represented in solid lines, which is connected by a vacuum line only to the gear 3. The rotation of the gear 3 produces a vacuum on the outlet side, so that any air trapped in the material is eliminated. If the vacuum source 26 is used instead of vacuum source 24, the extruder 19 will have only one inlet channel and will therefore be configured only for the feeding of one strip of material.

In the embodiment according to FIG. 6, an extruder nozzle 28 is forced by a compression spring 29 formed by plate springs against a shoulder 30 on the outlet side. The extruder nozzle can then shift slightly axially in the event of volumetric fluctuations and thus smooth out pulsations.

We claim:

1. An extruder for the plastification and extrusion of a rubber mixture fed in the form of at least one cold strip of material, comprising two gears disposed in a housing and meshing with one another, at least one inlet passage at the inlet side for the material strip and one outlet in the circumferential surface of the housing, the direction of rotation of the gears being such that the material strip is advanced between a gear and the housing to an outlet, wherein the inlet passage is provided in an insert held releasably in the housing of the extruder.

2. An extruder according to claim 1, wherein the insert comprises a plastic with good antifriction properties for the material strip that is to be fed.

3. An extruder according to claim 2, wherein the insert comprises polytetrafluoroethylene.

4. An extruder according to claim 1, wherein the housing has on its inlet side at least one at least approximately circular cavity from which an opening of rectangular cross section leads to a gear, and the insert is seated with appropriate shape in the cavity and opening.

5. An extruder according to claim 4, wherein the insert is held in the cavity and opening by a frame screwed to the housing and reaching beyond the insert.

6. An extruder according to claim 4, wherein two circular cavities, each with an opening, are provided at the inlet side, the cavities intersecting at the level of the area of engagement of the gears, and accordingly two inserts in a mirror-image relationship are provided with a flat on the confronting sides.

7. An extruder according to claim 1, wherein the inlet passages lead each to a pocket tapering wedge-like toward the gear in the running direction of the gear.

8. An extruder according to claim 7, wherein the wall surface of the pocket opposite the gear is cambered across the width of the gear and at the center of the gear is at a closer distance from the gear than at the sides.

9. An extruder according to claim 1, comprising two inlet passages beginning at a distance apart from one another and a feeder means forcing the material strip toward the extruder is disposed in front of the extruder between the inlet passages.

10. An extruder according to claim 9, wherein the feeder means is driven at a slightly greater feed speed than the extruder, and a slip clutch is provided in order to equalize the different feed speeds.

11. An extruder according to claim 10, wherein the slip clutch is a hysteresis clutch working with a magnetic field.

12. An extruder according to claim 11, wherein the inlet passages have a connection with a vacuum source and an airlock for feeding the material strip.

13. An extruder according to claim 12, wherein the airlock is formed by an elastic hose of a size for feeding the material strip through it.

14. An extruder according to claim 1, wherein only one inlet passage is provided for feeding a material strip, and a vacuum connection is provided on the inlet side at the gear to which no inlet passage leads.

15. An extruder according to claim 1, wherein an extruder nozzle is held in the housing for axial displacement against the force of a compression spring.

16. An extruder according to claim 15, wherein the compression spring is formed by at least one plate spring placed against a shoulder on the outlet side of the housing.

* * * * *